United States Patent
Hardman

(10) Patent No.: US 9,499,416 B2
(45) Date of Patent: Nov. 22, 2016

(54) SEPARATOR

(75) Inventor: Peter Hardman, Cleveland (AU)

(73) Assignee: Envirosmart Pty Ltd, Brendale (AU)

( * ) Notice: Subject to any disclaimer, the term of this patent is extended or adjusted under 35 U.S.C. 154(b) by 258 days.

(21) Appl. No.: 14/004,040

(22) PCT Filed: Mar. 8, 2012

(86) PCT No.: PCT/AU2012/000246
§ 371 (c)(1),
(2), (4) Date: Oct. 15, 2013

(87) PCT Pub. No.: WO2012/119204
PCT Pub. Date: Sep. 13, 2012

(65) Prior Publication Data
US 2014/0042109 A1 Feb. 13, 2014

(30) Foreign Application Priority Data
Mar. 8, 2011 (AU) .................................. 2011900818

(51) Int. Cl.
| B01D 17/028 | (2006.01) |
| B01D 21/28 | (2006.01) |
| B01D 17/00 | (2006.01) |
| B01D 17/02 | (2006.01) |
| B01D 17/04 | (2006.01) |

(52) U.S. Cl.
CPC .................. C02F 1/40 (2013.01); B01D 17/00 (2013.01); B01D 17/0211 (2013.01); B01D 17/041 (2013.01); B01D 21/283 (2013.01)

(58) Field of Classification Search
CPC .......... B01D 17/0211; B01D 17/0214; B01D 17/041; B01D 21/2472; B01D 21/283; B01D 2021/0081; C02F 1/40; F04D 25/105; F16H 21/44

USPC ....... 210/802, 803, 521, 522, 523, 538, 540; 310/40.5; 74/99 R
See application file for complete search history.

(56) References Cited

U.S. PATENT DOCUMENTS

| 1,530,087 | A | * | 3/1925 | MacArthur | 210/540 |
| 1,701,068 | A | * | 2/1929 | Flowers | 210/208 |
| 1,940,794 | A | * | 12/1933 | Fisher | 210/522 |
| 2,256,055 | A | * | 9/1941 | Probst | F04D 25/105 74/70 |
| 2,570,304 | A | * | 10/1951 | Bach | 210/802 |
| 3,067,878 | A | * | 12/1962 | Genter et al. | 210/802 |
| 3,903,000 | A | * | 9/1975 | Miura et al. | 210/521 |
| 4,697,468 | A | * | 10/1987 | Bergstrand | F16H 21/44 74/99 R |
| 5,840,198 | A | * | 11/1998 | Clarke | 210/802 |
| 6,171,483 | B1 | * | 1/2001 | Eden et al. | 210/521 |
| 6,881,350 | B2 | * | 4/2005 | Wilson | 210/521 |
| 8,317,036 | B2 | * | 11/2012 | Roberts | 210/521 |
| 2005/0023219 | A1 | | 2/2005 | Kirker et al. | |
| 2009/0095690 | A1 | * | 4/2009 | McCabe | 210/251 |

FOREIGN PATENT DOCUMENTS

JP 2011-011116 A 1/2011

* cited by examiner

*Primary Examiner* — Christopher Upton
(74) *Attorney, Agent, or Firm* — Boyle Fredrickson S.C.

(57) ABSTRACT

The present invention relates to a separator including one or more separation members upon which residue can accumulate. An agitator is provided for agitating the separation members to remove the residue. The agitator may clean residue from the members without removing the separation members from the separator. Advantageously, the frequency that the members need to be removed from the separator and thoroughly cleaned is reduced when compared with the known separator.

18 Claims, 4 Drawing Sheets

SEPARATOR

TECHNICAL FIELD

The present invention relates to a separator including, for example, an oil water separator.

BACKGROUND

The reference to any prior art in this specification is not, and should not be taken as an acknowledgement or any form of suggestion that the prior art forms part of the common general knowledge.

A known oil-water separator 1 is shown in FIG. 1. The separator 1 includes a container 2 which houses a number of oleophilic separation plates 4. In use, a oil-water solution is provided to the plates 4 through an inlet 6. Turbulent flow of the solution over the plates 4 causes the oil and water to separate. The oil can be drained through a top outlet 8, clean water can be drained through an intermediate outlet 10, and settled residue or sludge at the base of the container 2 can be drained through a bottom outlet 12.

Over time, oily residue accumulates on the oleophilic separation plates 4 and adversely affects the separation of the oil and water. Accordingly, it is necessary to periodically remove the plates 4 from within the container 2 and clean away the accumulated residue to restore the optimum function of the separator 1. This cleaning process is undesirably laborious and time intensive, involving the careful disassembly and reassembly of the fixed array of separation plates 4.

It is an object of the present invention to provide a separator with improved cleanabilty.

SUMMARY OF THE INVENTION

According to one aspect of the present invention, there is provided an oil-water separator including:
  one or more oleophilic separation plates against which turbulent flow of an oil-water solution impacts to separate oil and water, and upon which residue can accumulate during separation; and
  an agitator for agitating the separation plates to remove the residue.

The agitator may clean residue from the plates without removing the separation plates from the separator. Advantageously, the frequency that the plates need to be removed from the separator and thoroughly cleaned is reduced when compared with the known separator.

The agitator may include a reciprocator for reciprocating the separation plates. Preferably, the reciprocator rotationally reciprocates the separation plates in a clockwise/anticlockwise manner. The reciprocator may include a ram. The ram may include either a pneumatic or electric motor.

The separator may further include a flusher for flushing the separation plates with cleaning fluid.

The separator may further include a container in which the separation plates are located and defining an outlet at its base through which settled residue can be removed. The separator may include a floor which slopes toward the outlet to facilitate removal of the settled residue through the outlet. The separator may further include a chute extending from the floor to the outlet. The separator may further include a flusher at the base of the container to facilitate flushing the settled residue through the outlet. The flusher may be arranged to generate a vortex within the base of the container.

The separation plate may have the general shape of a truncated cone. In one embodiment, the separator may include a lid for rotationally mounting to the container. The separation plates may be releasably and serially mounted to a rack extending from the lid. The rack may include a quartet of frame elements. The separator may include a bridge mounted to the container for supporting the agitator.

According to another aspect of the present invention, there is provided a method for cleaning an oil-water separator, the separator including one or more oleophilic separation plates against which turbulent flow of an oil-water solution impacts to separate oil and water, and upon which residue can accumulate during separation, the method involving agitating the separation plates to remove the residue.

According to another aspect of the present invention, there is provided a controller configured to clean an oil-water separator, the separator including one or more oleophilic separation plates against which turbulent flow of an oil-water solution impacts to separate oil and water, and upon which residue can accumulate during separation, the controller configured to agitate the separation plates to remove the residue.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
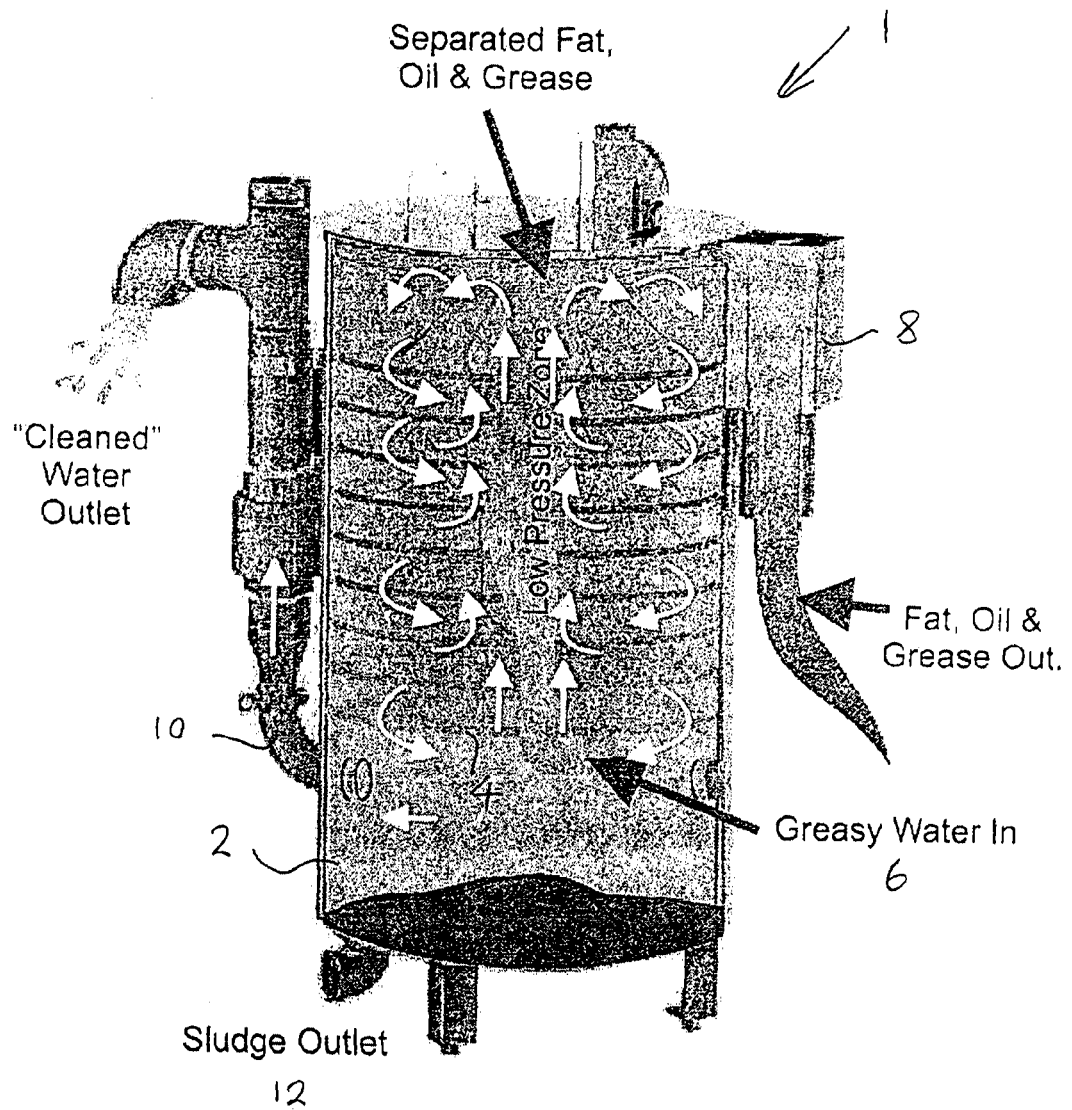
FIG. 1 is a schematic diagram of a known oil-water separator.
Figure 2:
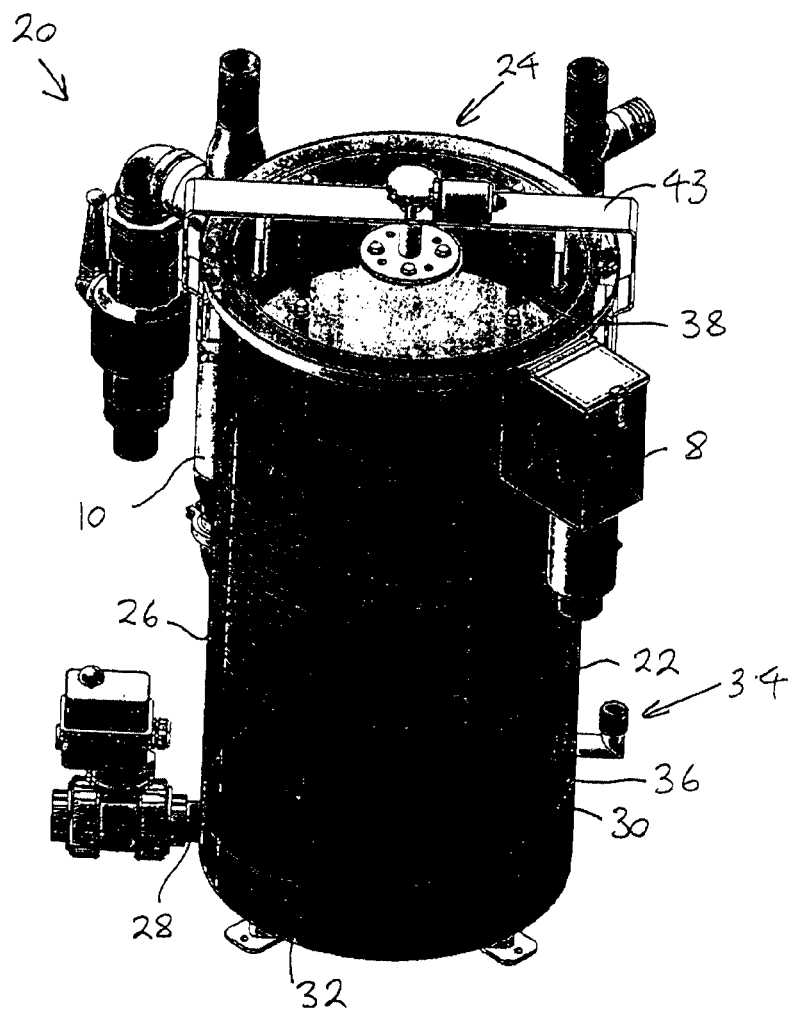
FIG. 2 is a perspective view of an oil-water separator according to an embodiment of the present invention.

According to an embodiment of the present invention, there is provided a oil-water separator 20 as shown in FIG. 2. The separator 20 includes oleophilic separation plates 22 upon which oily residue can accumulate. A reciprocator 24 shown more clearly in FIG. 3 can reciprocate the separation plates 22 to remove the oily residue, and thereby reduce the frequency that the separation plates 22 need to be removed from the separator 20 and thoroughly cleaned. A detailed description of the improved cleanability separator 20 is provided below.

Returning to FIG. 2, the separator 20 further includes a cylindrical container 26 in which the separation plates 22 are located. The container 26 defines an outlet 28 in a slidewall at its base through which settled residue can be removed. The separator 20 also includes a floor 30 which slopes toward the outlet 28 to facilitate removal of the settled residue through the outlet 28. Furthermore, the separator 20 includes a residue chute 32 extending from the lower end of the floor 30 to the outlet 28.

The separator 20 further includes a residue flusher 34 at the base of the container 26 to facilitate flushing the settled residue through the residue outlet 28. The residue flusher 34 includes a bent outlet pipe 36 arranged to project flow against the side wall of the container 26 to generate a vortex within the base of the container 26. In use, the vortex facilitates collection of the settled residue which is passed into the chute 32 and through the outlet 28.

Figure 4:
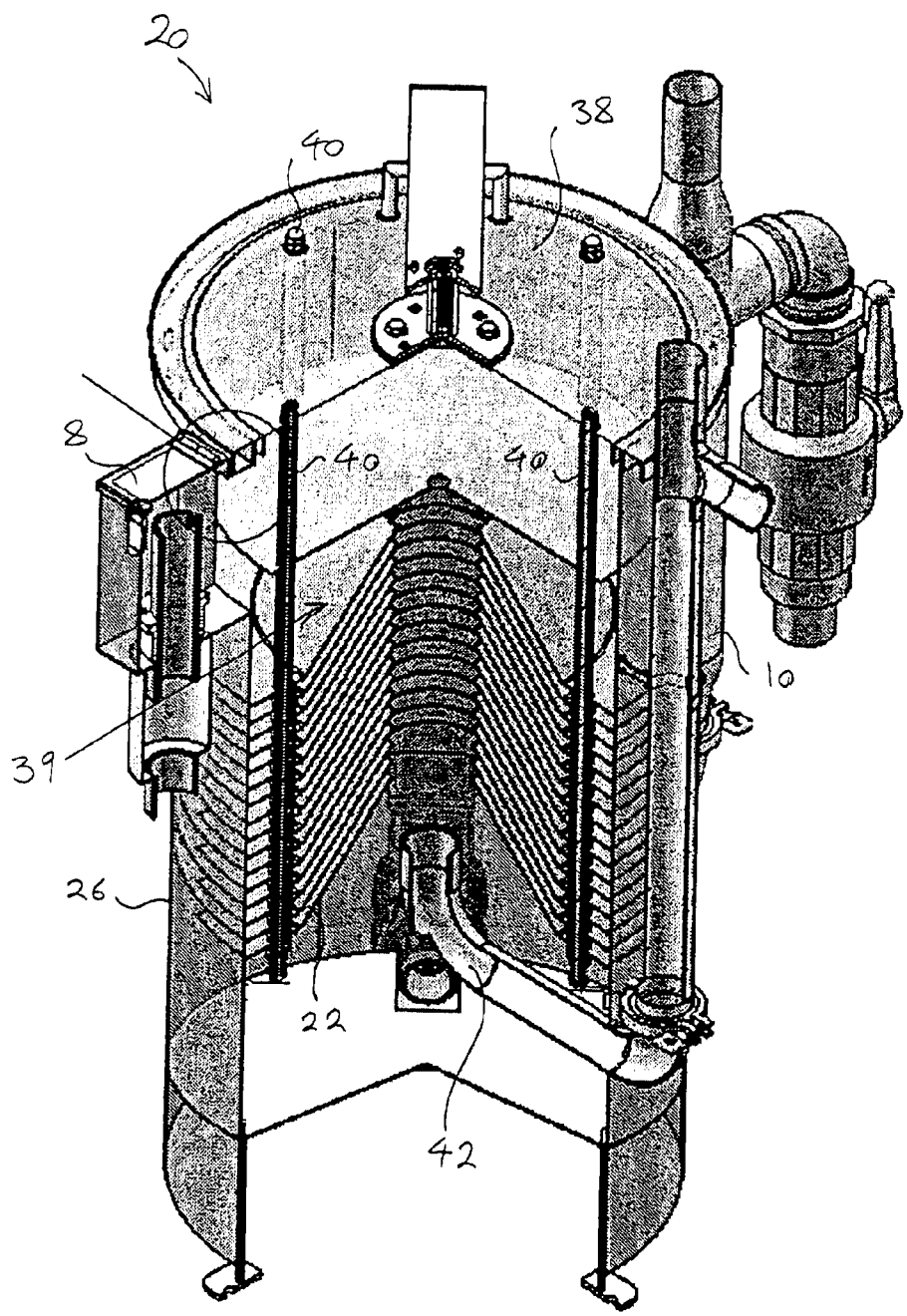
FIG. 4 is a partially sectioned perspective view of the separator of FIG. 2.

The separator 20 includes a lid 38 for rotationally mounting to the container 26 with a ball bearing arrangement. As can best be seen in FIG. 4, the separation plates 22 are releasably and serially mounted to a rack 39 extending downwardly from the lid 38. The rack includes a quartet of frame elements 40 that extend through peripheral flanges of the separation plates 22. Each separation plate 22 has the general shape of a truncated cone. The separator 20 further includes a plate flusher 42 for flushing the separation plates 22 with cleaning fluid (e.g. fresh water) during cleaning.

Figure 3:
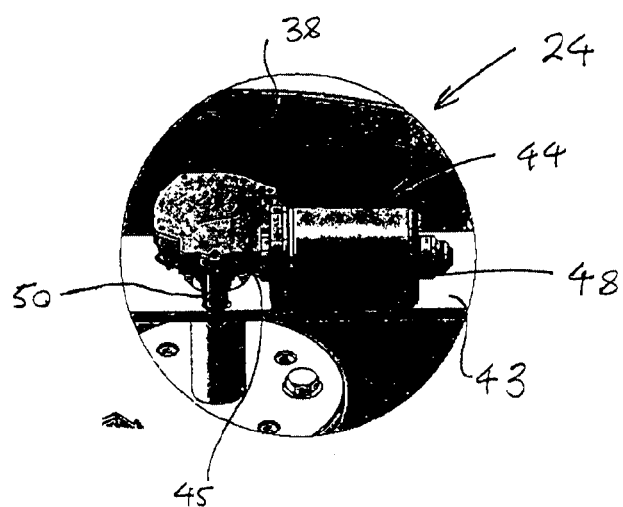
FIG. 3 is a perspective view of a reciprocator of the separator of FIG. 2.

As can best be seen in FIGS. 2 and 3, the separator 20 includes a bridge 43 mounted to the container 26 for supporting the centrally mounted reciprocator 24. The reciprocator 24 rotationally reciprocates the separation plates 22 in a clockwise/anticlockwise manner. To this end, the reciprocator 24 includes a ram (or piston) 44 with a working rod 45 mounted to a rotational head 46. The ram 44 includes either a pneumatic or electric motor 48 which drives the working rod 45 back and forth relative to the motor 48. The head 46 terminates a rotational shaft 50 extending upwardly from the rotational lid 38, in turn, from which the rack 39 of separation plates 22 depend. During cleaning, the linearly reciprocating working rod 45 causes the rotational reciprocation of the lid 38 and separation plates 22.

Figure 5:
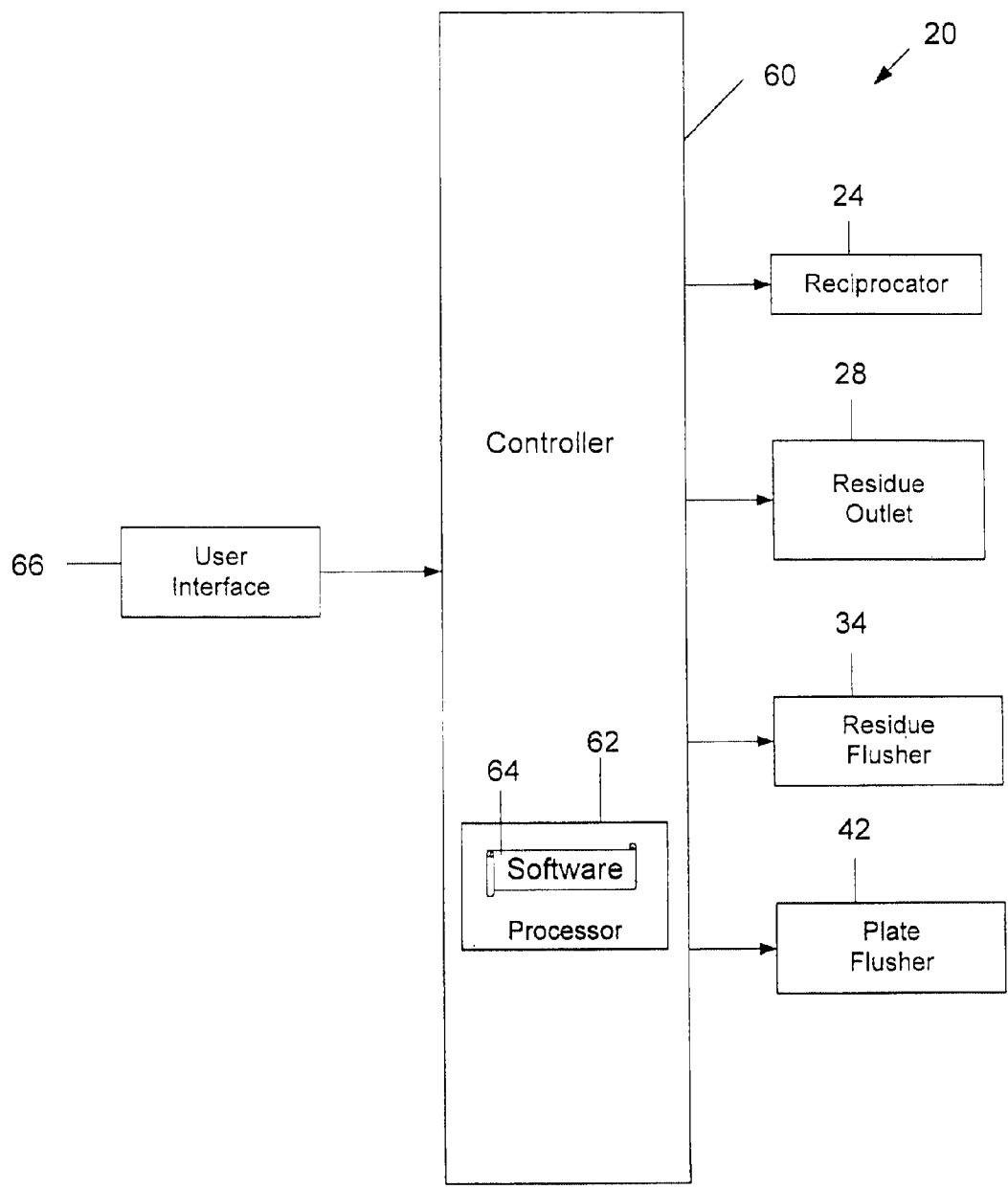
FIG. 5 is a block diagram of the separator of FIG. 2.

Turning to FIG. 5, the separator 20 further includes a controller 60 configured to perform an automatic cleaning method. The controller 60 includes a processor 62 loaded with a software product 64. The software product 64 includes machine readable instructions for performing the automatic cleaning method described below.

Initially, the separator 20 has ceased separating the oil-water solution and the residue outlet 28 is closed. The clean water has been drawn out through the clean water outlet 10. The controller 60 receives user input from a user interface 66 to indicate that the automatic cleaning procedure should be initiated.

Next, the controller 20 actuates the residue flusher 34 and opens the residue outlet 28 so that residue at the base of the container 26 is drained.

The controller 20 also actuates the plate flusher 42 concurrently with the reciprocator 24 so that built-up residue on the plates 22 is removed and moves to the base of the container for draining through the residue outlet 28.

The foregoing cleaning process can be performed periodically.

A person skilled in the art will appreciate that many embodiments and variations can be made without departing from the ambit of the present invention.

For example, the reciprocator 24 can also be actuated during separation of oil and water during regular operation of the separator 20.

The preferred embodiment was described in relation to a rotational cleaning reciprocator 24. In an alternative embodiment, another type of mechanical agitator for agitating the separation plates 22 to remove the residue can instead be used.

In compliance with the statute, the invention has been described in language more or less specific to structural or methodical features. It is to be understood that the invention is not limited to specific features shown or described since the means herein described comprises preferred forms of putting the invention into effect.

The claims defining the invention are as follows:

1. An oil-water separator including:
   one or more oleophilic separation plates against which turbulent flow of an oil-water solution impacts to separate oil and water, and upon which residue can accumulate during separation;
   a mechanical agitator operatively coupled to the separation plates that agitates the separation plates by rotational motion to remove the residue;
   a container in which the separation plates are located and defining an outlet at its base through which settled residue can be removed; and
   a lid rotationally mounted to the container, wherein the separation plates are carried thereby, wherein the agitator is operatively coupled by the lid to the separation plates, and wherein the agitator agitates the separation plates by agitating the lid.

2. A separator as claimed in claim 1, wherein the agitator cleans residue from the separation plates while the separation plates are disposed in the separator and the residue is deposited in the separator.

3. A separator as claimed in claim 1, wherein the agitator comprises a reciprocator that reciprocates the separation plates.

4. A separator as claimed in claim 3, wherein the reciprocator rotationally reciprocates the separation plates back and forth in a clockwise/anticlockwise manner.

5. A separator as claimed in claim 3, wherein the reciprocator includes a ram comprised of a shaft and a pneumatic motor or electric motor that drives the shaft.

6. A separator as claimed in claim 1, wherein the agitator comprises a pneumatic motor or electrical motor operatively coupled by a rotational head to a generally vertically extending rotational shaft extending upwardly from the lid that agitates the separation plates by rotating the lid thereby rotating the separation plates.

7. A separator as claimed in claim 1, further including a flusher for flushing the separation plates with cleaning fluid or fresh water.

8. A separator as claimed in claim 7, wherein the flusher for flushing the separation plates directs the cleaning fluid from below the separation plates.

9. A separator as claimed in claim 1, including a floor which slopes toward the outlet to facilitate removal of the settled residue through the outlet.

10. A separator as claimed in claim 9, further including a chute extending from the floor to the outlet.

11. A separator as claimed in claim 1, further including a flusher at the base of the container to facilitate flushing the settled residue through the outlet.

12. A separator as claimed in claim 11, wherein the flusher is arranged to generate a vortex within the base of the container.

13. A separator as claimed in claim 1, wherein the separation plates are releasably and serially mounted to a rack extending from the lid.

14. A separator as claimed in claim 13, wherein the rack includes a quartet of frame elements.

15. A separator as claimed in claim 1, including a bridge mounted to the container and supporting the agitator.

16. A separator as claimed in claim 1, wherein the separation plate has a general shape of a truncated cone.

17. A separator as claimed in claim 1, wherein the mechanical agitator converts linear motion to rotational motion to remove the residue.

18. A separator as claimed in claim 1, wherein the mechanical agitator is located at the top of the separator and is mounted to the lid.

* * * * *